United States Patent [19]

Biale

[11] Patent Number: 5,185,396

[45] Date of Patent: Feb. 9, 1993

[54] WATER-BASED VARNISHES

[75] Inventor: John Biale, Anaheim, Calif.

[73] Assignee: Rohm and Haas Company, Philadelphia, Pa.

[21] Appl. No.: 575,417

[22] Filed: Aug. 30, 1990

Related U.S. Application Data

[63] Continuation-in-part of Ser. No. 396,854, Aug. 21, 1989.

[51] Int. Cl.$^5$ ............................................. C08L 33/00
[52] U.S. Cl. .................................. 524/820; 524/821; 524/828; 524/831; 524/832
[58] Field of Search ............... 524/804, 820, 821, 828, 524/831, 832

[56] References Cited

U.S. PATENT DOCUMENTS

| | | | |
|---|---|---|---|
| 3,297,612 | 1/1967 | Lee et al. | 260/29.6 |
| 3,714,106 | 1/1973 | Smith et al. | |
| 4,153,592 | 5/1979 | Burroway et al. | 526/317 |
| 4,246,387 | 1/1981 | Deutsch | 526/209 |
| 4,341,679 | 7/1982 | Burgess et al. | 524/833 |
| 4,617,230 | 10/1986 | Shah et al. | 428/288 |
| 4,713,412 | 12/1987 | Czerepinski et al. | 524/833 |

OTHER PUBLICATIONS

Simpson, Progress is Organic Coatings, 6:1–30 (1978).
Warson, Gloss Emulsion Paints, 2d Ed., Solihull Chemical Services, West Midlands, England (1983).
Rhoplex HG-74, Rohm and Haas Company Trade Sales Flyer (1986).

Primary Examiner—Melvyn I. Marquis
Assistant Examiner—Mark Sweet
Attorney, Agent, or Firm—James G. Vouros

[57] ABSTRACT

A polymeric emulsion comprising a (i) polymer, (ii) water, and (iii) a surfactant is useful as a binder for a water-based varnish that is resistant to water, 50% ethanol, and alkali. The polymer comprises about 20 to about 40 weight percent of a soft non-functional monomer whose homopolymer has a $T_g$ of less than about $-20°$ C., about 60 to about 80 weight percent of a hard non-functional monomer whose homopolymer has a $T_g$ of greater than about 30° C., about 1 to about 5 weight percent of an olefinic carboxylic acid, and about 2 to about 10 weight percent of a cross-linking monomer. The hard monomer component of the polymer comprises a monomer selected from the group consisting of alkenyl aromatic monomers, non-functional methacrylic monomers, and mixtures thereof. Typically, the polymer comprises less than about 1 weight percent surfactant and has a calculated $T_g$ of about 25° to about 60° C., an actual $T_g$ of about 30° to about 70° C., and an average particle size of less than about 250 nm. The emulsion generally comprises at least about 40 weight percent solids and has a surface tension of at least about 45 dynes/cm.

15 Claims, No Drawings

WATER-BASED VARNISHES

CROSS-REFERENCE TO RELATED APPLICATIONS

This application is a continuation-in-part of application Ser. No. 07/396,854, filed Aug. 21, 1989, which is now pending, which application is incorporated herein in its entirety by reference.

BACKGROUND

The present invention relates to polymeric emulsions and to varnishes.

Due to increasingly more stringent regulations limiting the volatile organic content (VOC) of coatings, e.g., paints and varnishes, and the ease of handling water-based materials, the coating industry is continuously reformulating solvent-based coatings to meet VOC specifications and, wherever possible, replacing solvent-based products with water-based materials.

However, varnishes, which are required to possess block resistance, good gloss, and exceptional resistance to (a) water, (b) 50 weight percent (wt %) aqueous ethanol solution, and (c) mild alkali, e.g., 1 wt % aqueous trisodium polyphosphate (TSP) solution, have remained predominantly the exclusive area of solvent-based formulations.

SUMMARY OF THE INVENTION

The present invention provides water-based polymeric emulsions that are useful as a binder for water-based varnishes. The water-based varnishes exhibit block resistance, good gloss, and exceptional resistance to (a) water, (b) 50 wt % ethanol, and (c) mild alkali. The polymeric emulsions generally contain at least about 40 percent solids and comprise a (i) a polymer, (ii) water, and (iii) a surfactant-containing locus for polymerization. Usually, the emulsion comprises less than about 1 weight percent surfactant based on the total monomer weight in the polymer. The polymer generally comprises about 20 to about 40 weight percent soft monomer, about 60 to about 80 weight percent hard monomer, about 1 to about 5 weight percent olefinic carboxylic acid monomer, and about 2 to about 10 weight percent cross-linking monomer. At least a portion of the hard monomer component of the polymer is selected from the group consisting of alkenyl aromatic monomers, non-functional methacrylic monomers, and mixtures thereof. Preferably, the polymer comprises about 60 to about 80 weight percent of a hard monomer selected from the group consisting of the alkenyl aromatic monomers, the non-functional methacrylic monomers, and mixture thereof. As used in the specification and claims, the term "soft monomer" means a non-functional monomer whose homopolymer has a $T_g$ of less than about $-20°$ C.; the term "hard monomer" means a non-functional monomer whose homopolymer has a $T_g$ of greater than about 30° C.; the term "non-functional monomer" means a monomer that is devoid of any group, e.g., hydroxyl, carboxyl, amide, and amine, that can undergo further reaction after polymerization of the monomer and also includes cross-linking monomers; and the terms "weight percent hard monomer," "weight percent soft monomer," "weight percent olefinic carboxylic acid monomer," and "weight percent cross-linking monomer" each mean the total dry weight of the respective constituent ingredient employed in making the polymer divided by the total weight of the monomers employed in making the polymer, this quotient being multiplied by 100%. Generally, the emulsions have a surface tension of at least about 45 dynes/cm and the polymers have an average particle size of less than 250 nm. When the emulsion is employed as the binder component of a varnish, the resulting water-based varnish, when applied to a surface and dried, forms a film that is resistant to, inter alia, water, 50% ethanol, and alkali.

DETAILED DESCRIPTION OF THE INVENTION

In accordance with the present invention, each polymeric emulsion comprises (i) a polymer, (ii) water, and (iii) a surfactant-containing locus for polymerization. Generally, the emulsion comprises less than about 1 weight percent surfactant. As used in the specification and the claims, "weight percent surfactant" is defined as the total dry weight of the surfactant(s) employed in making the polymer divided by the total weight of the monomers employed in making the polymer, this quotient being multiplied by 100%. Preferably the emulsion comprises about 0.1 to about 1 weight percent surfactant and, more preferably about 0.25 to about 0.75 weight percent surfactant.

In general, when all other parameters are held constant, the lower the surfactant content of the polymer, the more insensitive the polymer is to water and the higher the surface tension of the emulsion. Typically, the emulsion has a surface tension of at least about 45 dynes/cm, and preferably about 45 to about 65 dynes/cm.

The surfactant is normally a copolymerizable surfactant, an anionic surfactant, a nonionic surfactant, or a mixture of two or more of these surfactants. Exemplary copolymerizable surfactants include, but are not limited to, sulfoethylmethacrylate, vinylsulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

The polymer generally comprises about 20 to about 40 weight percent of a soft monomer and about 60 to about 80 weight percent of one or more hard monomers. Preferably, the polymer comprises about 25 to about 35 weight percent soft monomer and about 65 to about 75 weight percent hard monomer.

The soft monomer, which is a non-functional monomer whose homopolymer has a Tg of less than about $-20°$ C., is typically selected from the group consisting of non-functional acrylic monomers, ethylene, and mixtures thereof. As used in the specification and claims, the term "non-functional monomer" means a monomer that is devoid of any group, e.g., hydroxyl, carboxyl, amide, and amine, that can undergo further reaction after polymerization of the monomer and includes cross-linking monomers. Non-functional acrylic monomers are the preferred soft monomers.

The soft non-functional acrylic monomers have the formula I

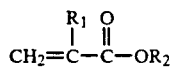

$$CH_2=\overset{\overset{R_1}{|}}{C}-\overset{\overset{O}{\|}}{C}-OR_2 \quad (I)$$

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. 2-ethylhexyl acrylate is the preferred soft, non-functional monomer.

With respect to the hard monomer (i.e., a non-functional monomer whose homopolymer has a $T_g$ of greater than about 30° C.), hard monomers include, but are not limited to, vinyl halides, methacrylamide, alkylene aromatic monomers, and non-functional methacrylic monomers. As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula II

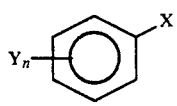

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred substituents on the alkenyl group are halogen radicals, e.g., chloride. However, the most preferred alkenyl group is unsubstituted, i.e., a hydrocarbon, and contains only one olefinic unsaturation. Vinyl is the most preferred X.

Y is an organic or inorganic radical. As used throughout the specification and claims, the term "organic radical" means any group containing at least one carbon atom, and the term "inorganic radical" means any group devoid of carbon atoxs. When n is 2 or more, Y can be the same or different. If organic, Y generally contains from 1 to about 15 carbon atoxs and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoxs. Y is more preferably a chloride radical and $C_1$ to about $C_4$ unsubstituted alkyl radicals.

Illustrative alkenyl aromatic monomers include styrene, p-methyl styrene, o-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

With respect to non-functional methacrylic monomers, exemplary non-functional methacrylic monomers have the formula III

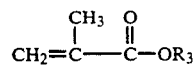

$$CH_2=\overset{\overset{CH_3}{|}}{C}-\overset{\overset{O}{\|}}{C}-OR_3 \quad (III)$$

wherein $R_3$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof.

The halide moiety of the vinyl halide monomers is preferably either chloride or bromide, with chloride being the most preferred halide moiety.

In contrast to the invention disclosed in application Ser. No. 07/396,854, filed Aug. 21, 1989, the water-based varnish of the present invention exhibits block resistance, good gloss, and exceptional resistance to (a) water, (b) 50 wt % ethanol, and (c) mild alkali without the presence of acrylonitrile in the polymer. Accordingly, an important aspect of the present invention is that the polymer is substantially devoid, and preferably totally devoid, of acrylonitrile. As used in the specification and claims, the term "substantially devoid" means that if any acrylonitrile is present in the polymer the acrylonitrile concentration is less than about 0.01 weight percent based on the total weight of monomers employed in making the polymer; and the term "totally devoid" means that the polymer is virtually free of acrylonitrile, i.e., any acrylonitrile concentration in the polymer being less than about 0.0001 weight percent based on the total weight of monomers employed in making the polymer.

Another important aspect of the invention is that the polymer comprises one or more olefinic carboxylic acid monomers and a hard monomer selected from the group consisting of alkenyl aromatic monomers, non-functional methacrylic monomers of formula III, or mixture thereof. Typically, the polymer comprises about 1 to about 5 weight percent olefinic carboxylic acid and preferably the polymer comprises about 2 to about 4 weight percent olefinic carboxylic acid.

Regarding the hard monomer component of the polymer, the polymer usually comprises about 60 to about 80 weight percent of a hard monomer selected from the group consisting of alkenyl aromatic monomers, non-functional methacrylic monomers of formula III, and mixtures thereof. Preferably, the hard monomer component of the polymer comprises about 65 to about 75 weight percent of a monomer selected from the group consisting of the alkenyl aromatic monomers, the non-functional methacrylic monomers of formula III, and mixtures thereof.

Olefinic carboxylic acid monomers include both mono-olefinic carboxylic acid monomers and di-olefinic carboxylic acid monomers. Exemplary mono-olefinic carboxylic acids include, but are not limited to, acrylic acid, methacrylic acid, and acrylamido glycolic acid. An exemplary di-olefinic carboxylic acid is itaconic acid. The preferred olefinic carboxylic acid monomer is methacrylic acid. However, mixtures of olefinic carboxylic acids can also be used.

The polymer also comprises a cross-linking monomer. Typical cross-linking monomers include, but are not limited to, N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula IV

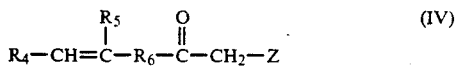

$$R_4-CH=\overset{R_5}{\underset{|}{C}}-R_6-\overset{O}{\underset{\|}{C}}-CH_2-Z \qquad (IV)$$

and mixtures thereof, wherein $R_4$ is selected from the group consisting of hydrogen and halogen, $R_5$ is selected from the group consisting of hydrogen, halo, thio, and monovalent organic radicals, $R_6$ is a divalent radical, and Z is selected from the group consisting of organoacyl and cyano. Preferably, $R_4$ is hydrogen, $R_5$ is hydrogen or an alkyl radical having up to about 10 carbon atoms, $R_6$ is a cyclic or acyclic organic radical containing up to about 40 carbon atoms, and Z is an organoacyl having the formula V

$$\overset{O}{\underset{\|}{-C}}-R_7 \qquad (V)$$

wherein $R_7$ is selected from the group consisting of hydrogen and monovalent organic radicals. More preferably, $R_6$ is an acyclic radical containing up to about 20 atoms in length, with any and all side groups each being up to about 6 atoms in length, and $R_7$ is hydrogen or an alkyl group containing up to about 7 carbon atoms. $R_6$ is most preferably an alkylene group containing up to about 10 carbon atoms, and $R_7$ is most preferably methyl. Due to its commercial availability, the preferred cross-linking monomer of formula IV is acetoacetoxyethyl methacrylate. However, the most preferred cross-linking monomer is 1,3-butylene dimethacrylate.

Generally, the polymer contains about 2 to about 10 weight percent cross-linking monomer, but preferably about 3 to about 8, and more preferably about 3 to about 6, weight percent cross-linking monomer.

The polymer preferably has an average particle size (i.e., an average maximum cross-sectional dimension) of less than about 250 nm. In general, for the polymer of the invention, the smaller the average particle size, the more water-resistant the polymer. Accordingly, it is preferred that the average particle size of the polymer be from about 85 to about 200 nm, more preferably from about 90 to about 190 nm, and most preferably from about 100 to about 150 nm.

The polymeric emulsion optionally comprises one or more other ingredients. For example, the polymer can comprise one or more ethyleneureido-containing monomers. Exemplary ethyleneureido-containing monomers include, but are not limited to, 2-ethyleneureido-ethyl acrylate, 2-ethyleneureido-methyl acrylate, 2-ethyleneureido-ethyl acrylamide, 2-ethyleneureido-ethyl methacrylamide, and 1-[2-(3-alloxy-2-hydroxy-propylamino)ethyl]imidazolidin-2-one. The preferred ethyleneureido-containing monomer is 1-[2-(3-alloxy-2-hydroxypropylamino)ethyl]imidazolidin-2-one, commercially known as Sipomer WAM brand monomer and available from Alcolac. The ethyleneureido-containing monomers are generally used in a concentration sufficient to enhance the wet adhesion strength of the emulsion, e.g., from about 0.25 to about 1 weight percent based on the total weight of the monomers employed in making the polymer.

A seed is another optional ingredient present in the polymer. The seed acts as a locus for polymerization and generally has an average particle size of less than about 80 nm, and preferably within the range of about 25 to about 60 nm. Exemplary seeds are comprised of a surfactant and a monomer, e.g., alkenyl aromatic monomers, acrylate monomers, and mixtures thereof. Usually, styrene and/or butyl acrylate monomers are employed in manufacturing the seed.

The polymers of the present invention demonstrate an actual $T_g$ of about 30° to about 70° C., preferably about 40° to about 60° C., and most preferably about 45° to about 60° C. There are several ways of determining the actual $T_g$ of the polymers. For purposes of the present specification and claims, the actual $T_g$ is determined by differential scanning calorimetry (DSC).

Interestingly, some of the polymers possess a different calculated $T_g$. The calculated $T_g$ of each polymer is derived by multiplying the weight percent of each constituent monomer by the $T_g$ of a homopolymer made from that monomer and adding all the resulting numerical products. Typically, the calculated $T_g$ of the polymers is between about 25° and about 60° C.

The emulsions of the present invention are made, for example, by a delayed addition polymerization process. Typically, the delay-addition polymerization process comprises forming a monomer mixture containing about 20 to about 40 weight percent soft monomer, about 60 to about 80 weight percent hard monomer, about 1 to about 5 weight percent olefinic carboxylic acid monomer, and about 2 to about 10 weight percent cross-linking monomer.

Water is added to a reactor and heated, generally to about 150° to about 190° F., while preferably purging the reactor with an inert gas, such as nitrogen, to remove substantially all oxygen from the reactor. A catalyst is then added to the reactor. Preferably, a locus for polymerization (e.g., a surfactant and/or a surfactant-containing seed) is added to the reactor before, simultaneously with, or after the catalyst addition to form a reactor charge. After the addition of the catalyst and locus for polymerization, the delay-addition of the monomer mixture is then commenced. The ensuing reaction forms the emulsion of the present invention. The addition of the monomer mixture typically takes up to about 3 hours. During the delay-addition of the monomer mixture, additional catalyst is typically also added to the reactor.

In an alternative synthesis procedure, a portion, for example up to about ½ of the monomer mixture, is added to the reactor at the beginning of the reaction along with the addition of the initial catalyst and/or seed and/or surfactant.

In order to stabilize the emulsion, toward the end of the monomer mixture addition, the pH of the emulsion is typically adjusted. Generally, the pH of the emulsion is adjusted to at least about 6, preferably to about 6 to about 10, and most preferably to about 6 to about 8. Adjusting the pH to within these ranges substantially neutralizes all olefinic carboxylic acid groups on the polymer.

Usually the pH of the emulsion is adjusted from about 30 minutes before to about 30 minutes after terminating the addition of the monomer mixture. Preferably, the pH adjustment occurs within about 15 minutes after terminating the monomer mixture addition.

After finishing the monomer mixture addition, further catalyst is commonly added while maintaining the emulsion at the elevated reaction temperature to ensure that substantially all of the monomers polymerize. The same catalyst can be used whenever one is employed. Exemplary catalysts include, but are not limited to, t-butyl hydroperoxide, sodium persulfate, hydrogen peroxide, and mixtures thereof.

The emulsion is allowed to cool to ambient or room temperature after all the monomer mixture and catalyst have been added. Usually, the pH of the cooled emulsion is adjusted, if necessary, to about 8 to about 10. Typically, a base is employed in each instance where the pH of the emulsion is adjusted. Exemplary bases are selected from the group consisting of amine-containing bases, hydroxide-containing bases, and mixtures thereof. Dimethylamine, diethylamine, aminopropanol, ammonium hydroxide, and sodium hydroxide are typical bases, with volatile bases being preferred, and ammonium hydroxide being the most preferred.

The polymerization process yields the polymeric emulsion of the present invention. The solids content of the emulsion is generally at least about 40 weight percent, preferably within the range of about 45 to about 60 weight percent, and more preferably within the range of about 45 to about 55 weight percent.

The emulsion is used as a binder in a water-based varnish. A typical varnish comprises a coalescing aid, a defoamer, a biocide, and the binder. Usually, the concentration of coalescing agent employed in the varnish is less than 50 parts by weight coalescing aid per 100 parts by weight dry polymer. Preferably, about 20 to less than 50, and more preferably about 30 to about 40, parts by weight coalescing aid are used per 100 parts by weight dry polymer. A rheology modifier, a mar-resistant agent (e.g., a wax emulsion), and a flattening agent (e.g., silica) are also sometimes used in water-based varnishes. Generally a varnish is clear and, in these instances, is typically devoid of a pigment or coloring agent. However, some varnishes are colored with a color-imparting agent, e.g., pigments, stains, and dyes. Coalescing aids, rheology modifiers, mar-resistant agents, flattening agents, color-imparting agents, defoamers, and biocides suitable for use in water-based varnishes are well known to those skilled in the art.

There is no need for a plasticizer to be present in a varnish and therefore none is used. In other words, the varnish of the present invention is preferably substantially devoid, and in fact is more preferably totally devoid, of any plasticizer, including those described in U.S. Pat. No. 4,153,592, which patent is incorporated herein in its entirety by reference. Likewise, the present varnish also does not require the presence of an amine having a boiling point in the range of about 50° to about 150° C. as required by U.S. Pat. No. 4,153,592. Therefore, the varnish is also preferably substantially devoid, and indeed more preferably totally devoid, of any such amine.

In use, the varnish is applied to at least a portion of a surface of a substrate. Typically, the varnish is dried at room temperature, i.e., at a temperature of about 30° to about 110° F., and more usually at a temperature of about 50° to about 90° F. Upon drying, the emulsion forms a film or coating that is resistant to, inter alia, water, 50 wt % ethanol, and mild alkali. More particularly, the film produced by the emulsions of the present invention do not exhibit spotting or physical degradation upon visual inspection when exposed, at room temperature and for at least about 17 hours, to a cotton swab moistened with either water or 50 wt % ethanol or 1 wt % TSP. Accordingly, the emulsion of the instant invention is a suitable binder for use in water-based varnishes.

EXAMPLES

The following examples demonstrate the preparation of exemplary polymeric emulsions within the scope of the present invention as well as the resistance to water, 50% ethanol, and alkali exhibited by films formed with water-based varnishes employing these emulsions as their binder component. However, the invention is not limited to the examples, but is defined by the claims.

EXAMPLES 1-2

Preparation of Polymeric Emulsions

Monomer mixtures having the compositions set forth in the following Table I were prepared:

TABLE I

| Example | ST$^a$ | 2EHA$^b$ | MAA$^c$ | MMA$^d$ | BDM$^e$ |
|---|---|---|---|---|---|
| 1 | — | 150 | 15 | 393 | 24 |
| 2 | 393 | 150 | 15 | — | 24 |

$^a$ST denotes styrene.
$^b$2EHA denotes 2-ethylhexyl acrylate.
$^c$MAA denotes methacrylic acid.
$^d$MMA denotes methyl methacrylate.
$^e$BDM denotes 1,3-butylene dimethacrylate.

In each of Examples 1-2, water (about 600 g) and Alipal EP110 brand anionic surfactant (about 4 g; 30 weight percent active; available from GAF Corporation) were charged to a reactor and heated while purging the reactor with nitrogen. When the charged reactor reached a temperature of about 180° F. sodium persulfate (about 0.9 g) was then added to the reactor. Next, the monomer mixture shown in the above Table I and a catalyst solution described below in Table II were separately, but simultaneously, added to the contents of the reactor over a period of about 3 hours while maintaining the temperature within the reactor at about 185° F.

TABLE II

| | Ingredients, g | | |
| Example | Sodium Persulfate | Water | Surf$^f$ |
|---|---|---|---|
| 1 | 0.9 | 75 | — |
| 2 | 0.9 | 75 | 2.8 |

$^f$Surf denotes Alipal CO436 brand anionic surfactant (58 weight percent active; available from GAF Corporation).

In Examples 1-2, immediately after finishing the addition of the catalyst solution and the monomer mixture, a solution containing about 6 ml ammonium hydroxide and about 20 ml water was added to the emulsion. The contents of the reactor were then cooked for another period of about 45 to about 60 minutes to polymerize substantially all unreacted monomers. After being cooked, the contents of the reactor were cooled to room temperature and a 10% ammonium hydroxide solution was added to the cooled reactor contents or emulsion in a sufficient amount to raise the pH of the emulsion. The total solid content and pH of the emulsions as well as the average particle size of the polymers (measured with a Nonsizer N4 brand particle sizer available from Coulter Electronics) are given in Table III, infra.

TABLE III

| Example | Particle Size, nm | Total Solids, wt. % | pH |
|---|---|---|---|
| 1 | 99 | 44.7 | 8.9 |
| 2 | 94 | 44.7 | 8.7 |

EXAMPLES 3-4

Formulation Of Varnishes

About 0.34 g Colloids 681F brand defoamer (available from Colloids, Inc.) was combined with one of the emulsions (about 106 g) of Examples 1-2. A premixture of butyl cellosolve (about 18.6 g) and water (about 15 g) was added to the composition with stirring. Finally, about 5.6 g of MichemLUBE 156 brand wax emulsion was added, while stirring, to the composition.

EXAMPLES 5-6

Resistance Tests

Oak panels were coated with the varnishes of Examples 3-4. The coating process entailed the step of coating a panel with a varnish, drying the coated panel at room temperature, and sanding the coated panel with fine sandpaper. This step was repeated two additional times with the sole modification that the coated panel was not sanded after the third drying procedure.

A plain cotton swab soaked with one of the three test liquids (i.e., water, 50 wt % aqueous ethanol, or 1 wt % aqueous TSP) was placed on the coated panel, covered with a glass dome-shaped lid to reduce evaporation, and allowed to sit there for about 17 hours at room temperature. After 17 hours, the wet cotton swab was removed and the coated panel was visually examined. The visual observations are noted in Table IV, infra.

TABLE IV

| Example | Varnish Containing Emulsion of | Water Test | 50% Ethanol Test | 1% TSP Test |
|---|---|---|---|---|
| 5 | Example 1 | OK$^g$ | OK | OK |
| 6 | Example 2 | OK | OK | OK |

The data provided in Table IV indicate that the water-based varnishes of the present invention (prepared using the above described polymeric emulsions as their binder component) form coatings that are resistant to water, 50% ethanol, and alkali.

Although the present invention has been described in considerable detail with reference to certain preferred versions thereof, other versions are possible. For example, the varnishes can include one or more ingredients that enhance other film and/or varnish properties. Therefore, the spirit and scope of the appended claims should not necessarily be limited to the description of the preferred embodiments contained herein.

What is claimed is:

1. A formulation formed by the step comprising combining a polymeric emulsion with a coalescing agent, wherein
    (A) the polymeric emulsion comprises (i) a polymer, (ii) water, and (iii) a surfactant-containing locus for polymerization, wherein the emulsion comprises about 0.1 to about 1 weight percent surfactant and the polymer has an average particle size of less than about 150 nm and a calculated $T_g$ of about 25° to about 60° C., and comprises:
        (a) about 20 to about 40 weight percent of a soft non-functional monomer whose homopolymer has a $T_g$ of less than about $-^{\circ\circ}$ C.;
        (b) about 60 to about 80 weight percent of a hard non-functional monomer whose homopolymer has a $T_g$ of greater than about 30° C., at least one hard monomer being selected from the group consisting of alkenyl aromatic monomers, non-functional methacrylic monomers, and mixtures thereof;
        (c) about 1 to about 5 weight percent of an olefinic carboxylic acid monomer; and
        (d) about 2 to about 10 weight percent of a crosslinking monomer selected from the group consisting of N-methylol acrylamide, N--methylol methacrylamide, diacrylates, dimethacrylates, triallyl cyanurate, diallyl maleate, and mixtures thereof; and
    (B) the formulation is substantially devoid an amine having a boiling point in the range of about 50° C. to about 150° C.

2. A formulation comprising a polymer and a coalescing agent, wherein
    (A) the formulation is substantially devoid of an amine having a boiling point in the range of about 50° C. to about 150° C.;
    (B) the polymer has an average particle size of less than about 150 nm and a calculated $T_g$ of about 25° to about 60° C., and comprises:
        (a) about 20 to about 40 weight percent of a soft non-functional monomer whose homopolymer has a $T_g$ of less than about $-20°$ C.;
        (b) about 60 to about 80 weight percent of a hard non-functional monomer whose homopolymer has a $T_g$ of greater than about 30° C., at least one hard monomer being selected from the group consisting of alkenyl aromatic monomers, non-functional methacrylic monomers, and mixtures thereof;
        (c) about 1 to about 5 weight percent of an olefinic carboxylic acid monomer; and
        (d) about 2 to about 10 weight percent of a crosslinking monomer selected from the group consisting of N-methylol acrylamide, N-methylol methacrylamide, diacrylates, dimethacrylates, triallyl cyanurate, diallyl maleate, and mixtures thereof, wherein the polymer is prepared by emulsion polymerizing the soft non-functional monomer, the hard non-functional monomer, the olefinic carboxylic acid monomer, and the crosslinking monomer in the presence of about 0.1 to about 1 weight percent of a surfactant selected from the group consisting of copolymerizable surfactants, anionic surfactants, nonionic surfactants, and mixtures thereof.

3. The formulation of claim 2 wherein the polymer is prepared in the presence of about 0.25 to about 0.75 weight percent surfactant.

4. The formulation of claim 2 being further substantially devoid of a plasticizer.

5. The formulation of claim 2 wherein the hard monomer is an alkenyl aromatic monomer.

6. The formulation of claim 2 wherein the hard monomer is a non-functional methacrylic monomer.

7. The formulation of claim 2 wherein the polymer comprises about 25 to about 35 weight percent soft monomer.

8. The formulation of claim 2 wherein the polymer comprises about 65 to about 75 weight percent hard monomer.

9. The formulation of claim 1 comprising less than 50 parts by weight coalescing agent per 100 parts by weight of dry polymer.

10. The formulation of claim 1 comprising about 20 to about 40 parts by weight coalescing agent per 100 parts by weight of dry polymer.

11. The formulation of claim 2 comprising less than 50 parts by weight coalescing agent per 100 parts by weight of dry polymer.

12. The formulation of claim 2 comprising about 20 to about 40 parts by weight coalescing agent per 100 parts by weight of dry polymer.

13. The formulation of claim 1 wherein the soft monomer is ethylhexyl acrylate.

14. The formulation of claim 2 wherein the soft monomer is ethylhexyl acrylate.

15. The formulation of claim 1 being further substantially devoid of plasticizer.

* * * * *